May 16, 1939.  W. N. SMITH ET AL  2,158,310
DEVICE FOR INDICATING THE STOPPING POINT OF A VEHICLE
Original Filed July 1, 1935  3 Sheets-Sheet 1
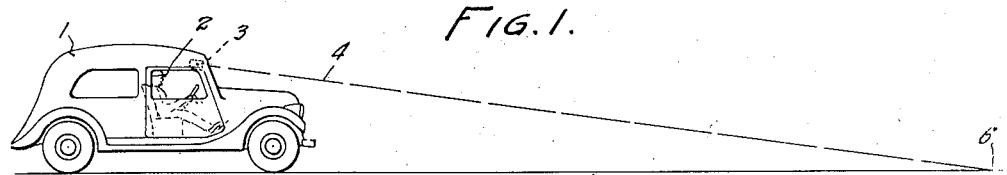
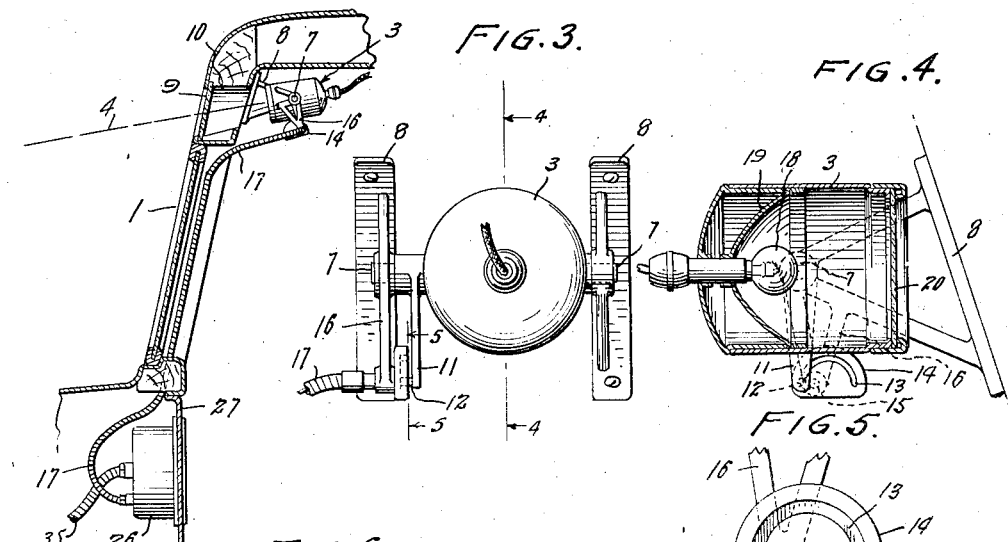
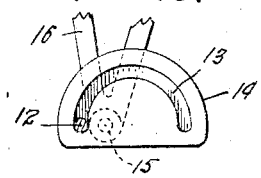
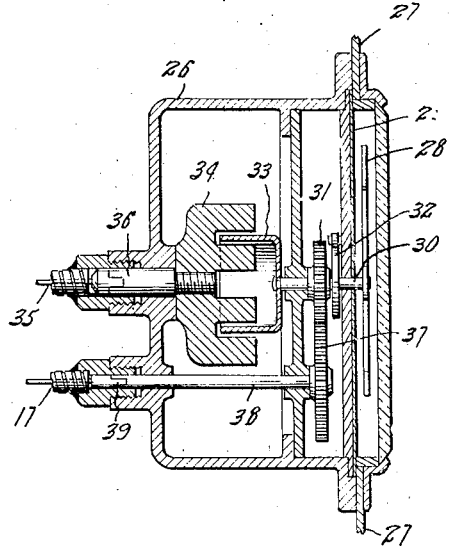
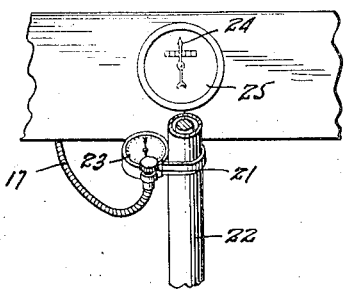
Inventors
WALTER N. SMITH AND
WILLIAM H. SANDERS
By Semmes & Semmes
Attorneys

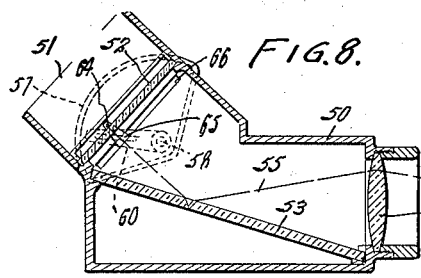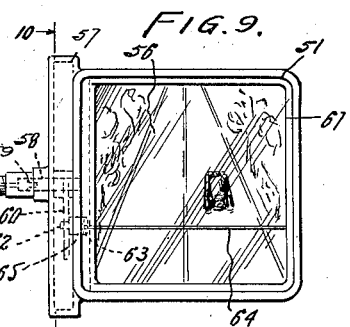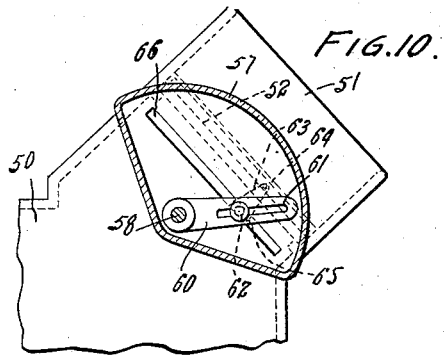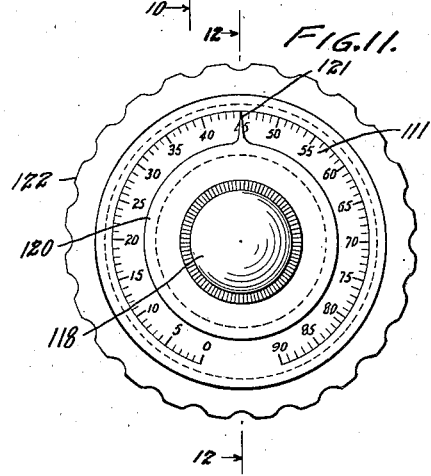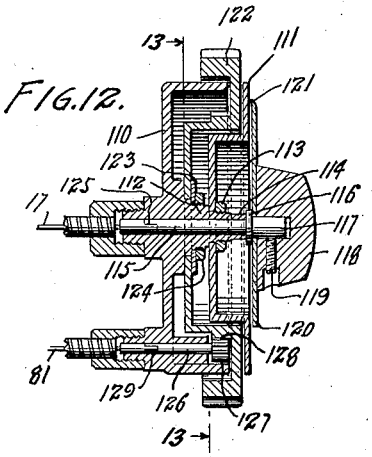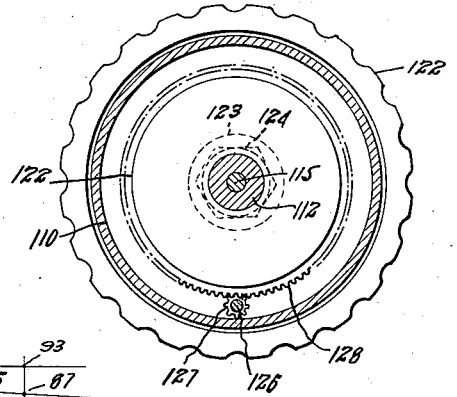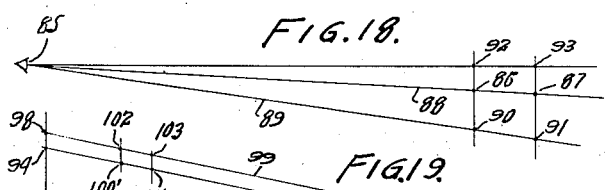

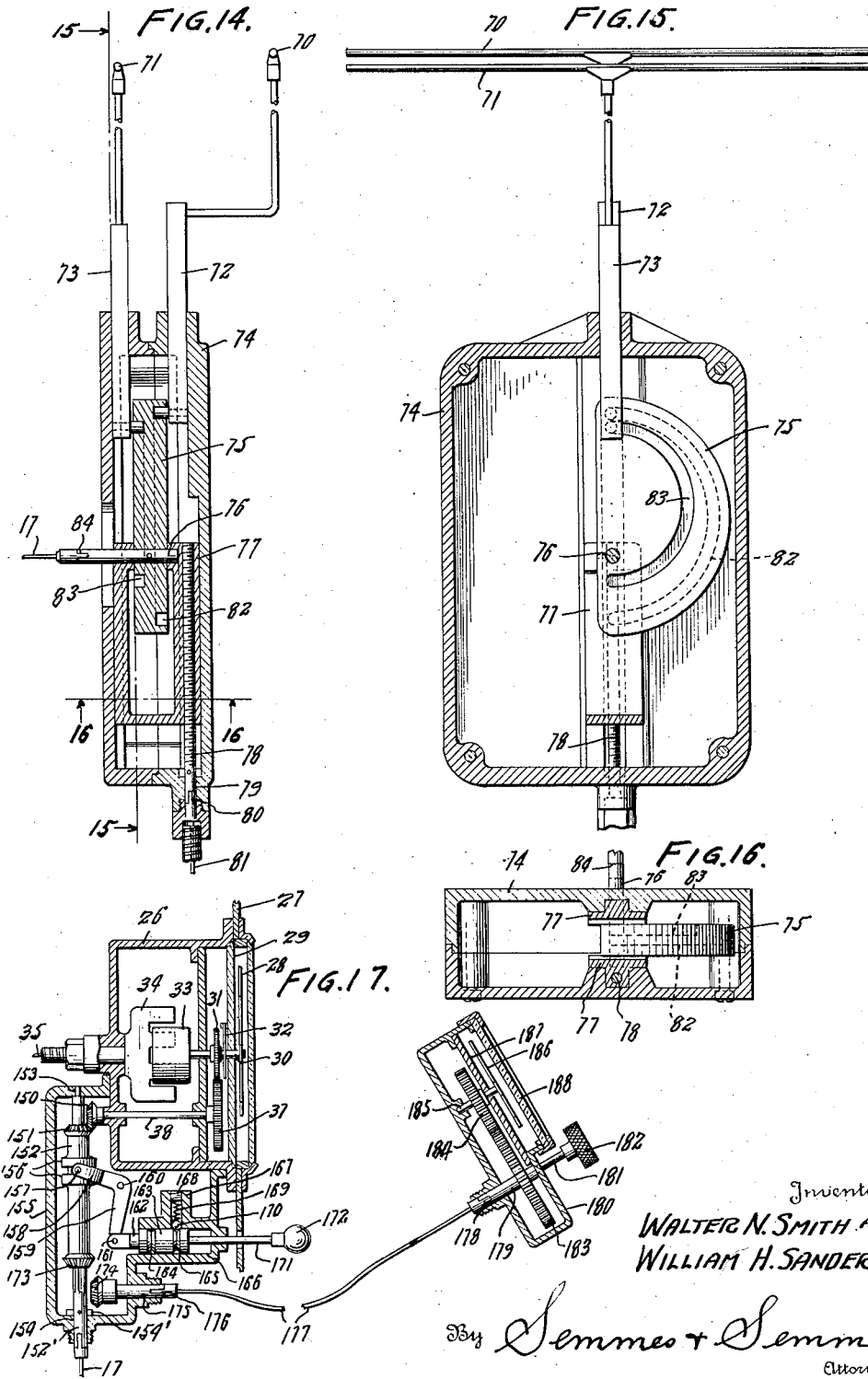

Patented May 16, 1939

2,158,310

UNITED STATES PATENT OFFICE 2,158,310

DEVICE FOR INDICATING THE STOPPING POINT OF A VEHICLE

Walter N. Smith, Cleveland, Ohio, and William H. Sanders, Washington, D. C.

Application July 1, 1935, Serial No. 29,390
Renewed March 25, 1939

8 Claims. (Cl. 33—46)

Our invention relates to devices for locating the stopping point of a vehicle.

There is a definite stopping point of a moving vehicle running on the level or a moderate slope for every speed of the vehicle. There are, of course, a number of factors, such as the power of the brakes, slope of the road, reaction time of the driver, and other factors, but in general a fairly accurate indication can be obtained of the stopping point of the vehicle once adjustments for variables have been made. The stopping point of a moving vehicle for every speed of the car is a function of the square of the velocity of the car.

It is an object of the invention to indicate definitely to the driver the point ahead at which the car can be stopped if desired.

It is a further object of the invention to achieve such results with apparatus which is simple to construct, sure in operation, and easy to repair and replace.

There are three methods which we employ, and which are described in this specification, and several forms of apparatus which may be either manually or automatically set. The first method is to direct the spotlight beam to the stopping point, the spotlight beam being directed to a point on the road ahead of the car, the point being located by the speed of the car. A second method is to employ a controllable sighting device which is controlled by the speed of the car and to look at the stopping point by means of this controllable sighting device.

Yet another method is to determine the stopping point by observing the place by a movable marker on an image of the road ahead of the car formed by an optical system. The position of the marker is determined by the speed of the car.

In the drawings:

Figure 1 is a schematic drawing showing a man driving a car on a road, employing a spotlight beam to indicate the stopping point;

Fig. 2 is an assembly view, partly in section, showing the spotlight and the speedometer, the means of connecting the same and the method of mounting;

Fig. 3 is a detail end view of the spotlight and mounting;

Fig. 4 is a view taken along the line 4—4 of Figure 3, looking in the direction of the arrows;

Fig. 5 is a detail view showing a cam control for the spotlight on line 5—5 of Fig. 3, looking in the direction of the arrows;

Fig. 6 is a cross sectional view taken through the combined speedometer and automatic setter for the stopping point location finder;

Fig. 7 is a fragmentary view showing the mounting of a hand setting arrangement on the steering post of a car;

Fig. 8 is a longitudinal sectional view of an optical system forming an image of the road ahead of the car;

Fig. 9 is a view looking in the housing and on the screen of the optical system shown in Figure 8;

Fig. 10 is a view taken along the line 10—10 of Figure 9, looking in the direction of the arrows;

Fig. 11 is a top plan view of an instrument for setting the eye level adjustment of a sighting system, and for manually setting the device for a definite speed;

Fig. 12 is a view taken along the line 12—12 of Figure 11, looking in the direction of the arrows;

Fig. 13 is a view taken along the line 13—13 of Figure 12, looking in the direction of the arrows;

Fig. 14 is a longitudinal sectional view of a form of sighting device;

Fig. 15 is a view taken along the line 15—15 of Figure 14, looking in the direction of the arrows;

Fig. 16 is a view taken along the line 16—16 of Figure 14, looking in the direction of the arrows;

Fig. 17 is a sectional view showing the combined automatic and manual setter for the stop location finder, together with means to shift to either an automatic or a manual setting;

Figure 18 is a diagrammatic drawing showing the geometry of the sighting device shown in Figures 14, 15 and 16;

Figure 19 is a diagrammatic view illustrating the effect of a change in height of the driver's eye in resetting the device illustrated in Figures 14, 15 and 16.

Referring to the drawings, in Figure 1 we have illustrated a car 1 in which sits a driver 2. There is provided in the car a spotlight 3 which throws a beam 4 on the road 5. The beam strikes the road at a point 6 somewhere in front of the car. The spotlight 3 is inclined to throw the beam 4 so that it will impinge on the road at the point 6 which corresponds to the stopping point of the vehicle for the particular speed at which it is travelling. In other words, if the vehicle is going rapidly, the point 6 will be further from the car than if the car is moving at a slower speed. The construction of the spotlight 3 and the control means will now be described.

Referring to Figures 2, 3 and 4, we have shown the spotlight 3 mounted on a shaft 7 which is journaled on support members 8 that are affixed to the upper interior of the car. The spotlight 3 is adapted to direct the beam through a pane of glass 9, which is affixed in an aperture 10 near the roof of the car. Mounted on the shaft 7 is an operating lever 11 having a cam finger 12 which is adapted to project within a groove 13 in a cam 14. The cam 14 is pivoted on a shaft 15 which is journaled at the apex of a support bracket 16, which may be integrally made with one of the brackets 8. It is to be noted that the shaft 15 which is adapted to be affixed to the cam 14 is eccentrically positioned on the cam 14.

The arrangement is such that upon rotation of cam 14 about the shaft 15, the cam finger 12 will cause the spotlight 3 to tilt to move the beam 4. The rotation of the cam 14 is accomplished by means of a flexible cable or Bowden wire connection 17. The setting of the cam 14 is in accordance with the speed of the car, as will be later described. The setting of the cam 14 may be either manual or automatic, as desired.

The spotlight 3 is provided with an electric lamp 18 having a small filament and positioned approximately at the focal center of a parabolic reflecting mirror 19. There is provided a front glass member 20 for the spotlight.

Manual operation of the device can be obtained by mechanism shown in Figure 7, wherein the Bowden wire 17 is adapted to travel to a knurled operating handle 21 mounted on a steering post 22 of the car. The knurled operating handle 21 which twists the Bowden wire 17 to rotate the cam 14 also operates an indicating pointer 23, through suitable gearing, to set the indicating pointer at a position corresponding to the pointer 24 of the speedometer 25.

Let us assume that the speedometer needle 24 is pointing to fifty miles an hour, then the needle of the indicator 23 will be pointed to fifty miles an hour by turning the knurled handle 21. Thus the cam 14 through the Bowden wire 17 will be rotated to assume a position for the fifty mile an hour speed, and the spotlight 3 will be so positioned as to direct the beam 4 to the position 6 on the road in front of the car, which will indicate the point at which the car can be stopped by normal application of the brakes.

Thus there is provided a safety element which is highly desirable. It will also be noted that our device provides a constant check on the efficiency of the brakes, and the operator at all times may determine whether adjustment of the brakes is necessary.

In Figure 6 we have shown an automatic means for setting the cam 14 through the Bowden wire 17. Here we have shown a magnetic drag speedometer having a casing 26 which is mounted on an instrument board 27 of the car. There is an indicating pointer 28 which indicates the speed of the car. This pointer 28 travels over the face 29 of a marked dial. The pointer 28 is mounted on a shaft 30 upon which is mounted a gear 31. A spring 32 tends to hold the pointer at the zero position. The shaft 30 has mounted at one end a cup 33 which operates within a grooved magnet 34. The grooved magnet 34 is revolved by means of a flexible cable or Bowden wire connection 35 in the usual manner that speedometers are driven through such flexible connection. The rotation of the Bowden wire 35 rotates the magnet 34 through a suitable coupling 36 which is journaled in the casing 26. Rotation of the magnet 34 rotates the cup 33 which rotates the shaft 30 against the tension of the spring 32 and indicates the speed of the car by moving the pointer 28 over the indicating face 29. The rotation of the shaft 30 likewise rotates the pinion 31 which meshes with the pinion 37 mounted on the shaft 38 which is journaled in the casing 26. The shaft 38, through a suitable coupling 39, is attached to the Bowden wire 17.

The operation, therefore, of the speedometer mechanism causes rotation of the Bowden wire 17 to rotate the shaft 15 of the cam 14, causing the cam 14 to move. This mechanism just described gives an automatic adjustment of the spotlight 3 through the speed of the car.

Another mechanism is shown in Figures 8, 9 and 10. This comprises an optical system which indicates a stopping point by relation of the movable element to the image of the road.

The optical system comprises a casing 50 having a sight opening 51 in which is mounted a ground glass screen 52. There is a sloped mirror 53 in the bottom of the casing 50 which is adapted to reflect rays of light which pass through a lens 54 mounted in the front of the casing 50. In Figure 8 we have indicated a single ray of light 55 which passes from the point on the road through the lens 54 and is bent thereby, as indicated, and then falls on the mirror 53 where it is reflected as indicated, striking against the ground glass screen 52. There are numbers of rays of light which are thrown on the screen 52, giving on the screen 52 an image of the road, as indicated at 56 (see Figure 9).

The casing 50 is provided with an extension casing 57 in which is pivoted a shaft 58 which is coupled, as indicated at 59, to the Bowden wire 17 previously referred to. The shaft 58 is adapted to be moved by rotation of the Bowden wire 17, and moves with it the operating arm 60, which is slotted at 61 to receive an operating member 62 that is affixed at the bottom of a support 63 which carries a wire indicating member 64. While we have shown a straight slot 61, it will be appreciated that this slot will be curved in practically all instances to compensate for the various variables, such as the projection of the image, the deceleration of the vehicle, and also the varying rate of lineal speed of the rod 64 as the arm 60 oscillates. The exact curve, of course, can be calculated by any person skilled in the art. The base of the support 63, which we have indicated by the numeral 65, is adapted to slide in a slot 66 formed in the side of the casing 50.

Upon movement of the operating arm 60 the support 63 is moved back and forth in the slot 66. The position of the operating arm 60 is determined by the speed of the car, and may be set either manually or automatically through rotation of the Bowden wire 17. The movement of the support 63 carries with it the wire 64 which indicates on the image 56 the stopping point on the road upon application of the brakes. It is to be noted that there is a bead formation 67 under which the wire 64 is adapted to slide, which protects it from injury.

Referring to Figures 14, 15 and 16, we have shown a sight mechanism for indicating the stopping point of the car. We prefer to use two sights, instead of only a single one, in order to prevent erroneous fixing of the stopping point arising from a movement of the operator's eyes. The operator must at all times look across the plane defined by the sights, and therefore, when he fails to do this he immediately knows that he has changed the position of his eyes. This mechanism comprises two sights, a front sight 70 near the eye of the observer and a rear sight 71 more distant therefrom. The distance between the sights 70 and 71 will be approximately two inches. Of course, if desired, the plane between sights 70 and 71 might be more clearly defined by bridging the space between them with a sheet-like material. This might take the form of a sheet of rubber, or other extensible material, extending between sights 70 and 71.

The sights are located in front of the driver, and probably in the body of the car. The sight 70 is mounted on a supporting slide member 72 and the sight 71 on a supporting slide member 73. Each of these members is adapted to reciprocate within the casing 74 which contains a cam member 75 that is pivoted on a shaft 76 within the casing. The shaft 76 is journaled within a movable slide member 77 which is provided with screw threads at one side (see Figure 14) which engage with screw threads on a screw member 78 that is journaled at its lower end at 79 in an extension of the casing 74. Through a suitable coupling 80 the screw member 79 is attached to a Bowden wire 81. The cam member 75 is provided with cam grooves 82 and 83, respectively. The shaft 76 projects from the side of the casing and is coupled, as indicated at 84, to the Bowden wire 17. Upon rotation of the Bowden wire 17 the cam member 75 is caused to rotate, which causes both sights 70 and 71 to move up and down relative to the eye, but at different rates as determined by the difference in the cam grooves 82 and 83. When the eye of the observer is behind the sight 70 and trained over the sights 70 and 71, he will observe a spot on the road which will be the stopping point of the car under normal application of the brakes. The higher the speed of the car, the higher will sight 71 be in relation to sight 70, thus locating the stopping point a relatively long distance in front of the car. In the drawings we have shown the device set at approximately high speed, as indicated by the position of the cam. At low speeds the cam would be revolved to bring the sight 71 considerably lower with respect to sight 70 than is indicated by the relative position of the sights in the drawings.

In order to properly adjust the sights so that the driver can readily line up his eye over the sights, we have shown means for raising and lowering them both simultaneously and equally, which comprise the screw member 78 which is adapted to be operated by the Bowden wire 81. Rotation of the screw member 78 will move the movable slide member 77 up and down in the casing, carrying with it the shaft 76, the cam 75 and the sliding members 73 and 72 which raise and lower the sights 71 and 70, equally.

In Figures 18 and 19 we have shown the geometry which relates to the sighting device illustrated in Figures 14, 15 and 16. Referring to Figure 18, 85 represents the driver's eye, points 86 and 87 represent the cross bars of sights 71 and 70. The line from 85 through 86 and 87 if prolonged would strike the road at the stopping point; this line may be called the sight line 88. As drawn in Figure 18, it may correspond to a car speed of, say, sixty miles an hour. At a lower speed, say forty miles an hour, the stopping point will be closer to the car and the sight line will make a greater angle with the plane of the road. The sight line for this lower speed is 89, passing through points 85, 90 and 91, points 90 and 91 corresponding to sight members 70 and 71, respectively. Thus, both sight lines pass through the eye, and no shift of the driver's eye is necessary to sight out the closer stopping point. To secure these operations, when the car speed decreases, sight bar 70 will be lowered to the position of point 90, and sight bar 71 to the point 91.

In Figure 18 the line through 85, 92 and 93 is a reference line drawn parallel to the road; lines 90 to 92 and 91 to 93 are perpendicular to line 85—92—93. It is evident that triangle 85—93—87 is similar to triangle 85—92—86; also that triangle 85—92—90 and triangle 85—93—91 are similar. Displacements of sighting bars or sights 70 and 71 occurring along lines 92—90 and 93—91, respectively, may be measured from line 85—92—93. These displacements are then evidently similar. They may readily be computed for determination of the proper ratio or shape of slots 83—82 in cam 75.

The effect of the change in the height of the driver's eye may be explained by reference to Figure 19. Here 94 represents the position of the driver's eye and 95 is his sight line to stopping point 96. Line 96—97 is the road with 97—94 perpendicular to 96—97. Suppose 98 is another possible position for the driver's eye, perhaps as he sits in a more erect position. In general the displacement 94—98 will be a small proportion of the distance 94—97 from eye to road. Thus for position 98 we can take sight line 99 as parallel to sight line 95. Line 99 will indicate point 100 as the stopping point. The displacement 96—100 is evidently a small percent of the stopping distance, just as 98—94 is a small percent of 94—97. Let 100' and 101 be positions for the sighting bars 70 and 71 to form sight line 95. Then as the driver's eye shifts from 94 to 98 we simply raise the sight bars an equal amount to points 102—103 respectively. Thus is the eye adjustment for raising both sight bars made by the sliding member 77 and the screw member 78.

Referring to Figures 11, 12 and 13, we have shown a manual means for rotating the Bowden wire 17 to given an indication of the stop for a particular speed. Here we have shown a casing 110 on which is mounted a scale 111 which is mounted on an extension 112 of the casing 110. This scale 111 is held in place by a screwed-on collar 113, which fits on screw threads on the extension 112. We have shown a smaller collar 114 which lies on a shaft 115 which is journaled within the extension 112 of the casing 110. Against this collar 114 bears an annular flange 116 which lies adjacent an enlargement 117 of the shaft 115. An operating knob 118 is placed over the extension 112 of the shaft 115, and is held in place by means of a sunken screw 119. The operating knob carries a plate 120 provided with a pointer 121 which is adapted to cooperate with the scale 111. Mounted on the extension 112 of the casing 110, and adapted to rotate thereon, is a knurled dial 122 which is held against an annular portion of the extension 112 by means of a washer 123 and a nut 124. The shaft 115 is coupled at 125 to the Bowden wire 17. Journaled in the casing 110 is a shaft 126 carrying a pinion 127 that meshes with gear teeth 128 formed on the operating member 122.

This shaft 126 is coupled at 129 to the Bowden wire 81. The Bowden wire 17 may be revolved by turning the operating knob 118, and the setting may be made for the desired speed, as indicated, for instance, at forty-five miles an hour in Figure 11. By revolving knurled member 122, shaft 126 may be revolved through small gear 127 meshing with gear teeth 128 on the knurled member 122. This, through the coupling 128, rotates the Bowden wire 81 which will operate to rotate the screw member 78 and raise or lower the sights 70 and 71, respectively and equally, to adjust for the normal height of the driver's eye, as previously explained.

Referring now to Figure 17, we have shown an arrangement whereby we may use either an automatic operation of the Bowden wire 17 to set our device by the speed of the car, or we may use manual operation, as desired.

Referring to Figure 17, we have shown a casing for a speedometer mechanism which is similar to the speedometer mechanism shown in Figure 6, the only difference being that the shaft 38 does not connect directly with the Bowden wire 17 but connects with a spur gear 150 which engages with another spur gear 151 mounted on a shaft 152, which slides on and is splined to a shaft 152', journaled at 153 at its top and 154 at its bottom in an auxiliary casing 155. A holding ring 154', which is attached to the shaft 152', holds the shaft 152' in position within the casing 155. The shaft 152 is provided with annular rings 156 which form a groove in which operate cam fingers 157 carried on a bifurcated end 158 of a bell crank 159 pivoted at 160.

The bell crank is slotted at one end and a screw 161, mounted on a rod 162, passes through the slot. The rod 162 is provided with an enlarged portion 163 which has ball engaging grooves 164 and 165. The enlarged portion 163 of the rod 162 is adapted to slide in a cylindrical casing 166. In the top of the casing is a spring housing 167 closed by a screw 168. The bottom portion of the screw bears against a spring 169 which in turn bears against a ball 170. The arrangement is such that the ball 170 is adapted to engage with the ball grooves 164 and 165 on the enlarged portion of the shaft 163. The engagement of the ball 170 under the pressure of the spring 169 in either one of the grooves 164 or 165 tends to hold the rod in a fixed position, but by manual pull on a rod 171 which is attached to the rod 162, by pulling or pushing on a handle 172, the rod 162 may be made to assume the desired position.

In Figure 17 the ball 170 is shown lying in the groove 165, which causes the bell crank lever 159 to assume the position shown in the drawings, in which the spur gear 151 meshes with the spur gear 150 and the control of the rotation of the Bowden wire 17 is automatic. By pulling out on the handle 172, the rod 162 may be made to assume the position where the enlarged portion of the rod 163 is positioned so that the ball 170 lies within the groove 164. This causes the bell crank 159 to move the rod 152 downward so that the spur gear 173 engages with a spur gear 174 for manual operation and rotation of the Bowden wire 17. The spur gears 150 and 151 will then be out of mesh and the automatic operation will not be possible.

In order to move the spur gear 174 when it is in contact with the spur gear 173 to give manual operation of the Bowden wire 17, we have shown the spur gear 174 attached to a shaft 175 which is journaled in the casing 153. Attached to the shaft is a coupling 176 which is attached to a flexible connection, such as a Bowden wire 177. This wire, or flexible connection, 177 is attached by a coupling 178 to a shaft 179 which is journaled in the casing 180. The shaft 179 is attached to a shaft 181 which is adapted to be rotated by an operating knob 182. The shaft 179 carries a gear 183 which meshes with a gear 184. The gear 184 is mounted on a shaft 185 journaled in the casing 180. The shaft 185 carries an indicating pointer 186 which travels over a scale 187. Mounted in the casing over the pointer 186 is a sight glass 188.

By rotating the operating knob 182 through the train of gears just described, the pointer 186 will move over the surface of the scale 187 and the desired speed setting of the device can be made. The rotation of the operating knob 182 rotates the flexible coupling 177, which rotates the spur gear 174 which is now in mesh with the spur gear 173, and thus the shaft 152' is rotated to rotate the Bowden wire 17 to adjust the stopping point location finder to the proper angular setting for the speed at which it is set.

By the mechanism shown in Figure 17, we are enabled to either have the stopping location finder set automatically through interlinking with the speedometer, or we can shift the clutch mechanism described and obtain a manual setting. It will of course be appreciated that the device shown in Figure 12 may be substituted for the manual setter shown in Figure 17.

When changing from automatic to manual operation, or vice versa, it is of course necessary that the reading of the two-speed indicators of the device shown in Figure 17 must correspond.

It will of course be appreciated that various adjustments may be necessary in the structures here disclosed to accord with the actual operating conditions of any particular automobile, or the instruments themselves, (such as the shapes of the cams, etc.), but such adjustments will be apparent to any skilled operator.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A device for indicating the stopping place of a moving vehicle, two sights, means to vertically adjust said sights relative to each other in accordance with the speed of the vehicle comprising a cam for controlling the two sights, a speedometer, a shaft rotated by the speedometer proportional to the speed of the vehicle, a manually operable setter shaft, a flexible cable for transmitting the motion of either shaft to the cam, and manually operable gear means for selectively connecting either shaft to said cable.

2. In a device for indicating the stopping place of a moving vehicle, two sights, means to vertically adjust said sights relative to each other in accordance with the speed of the vehicle comprising a cam for controlling the two sights, a speedometer, a shaft rotated by the speedometer, a manually operable setter shaft, a flexible cable for transmitting the motion of either shaft to the cam, and manual means to adjust the height of both sights.

3. A device for indicating the stopping point of a moving vehicle on a road comprising a pair of parallel horizontal bars carried by the vehicle and so arranged as to form a plane for the line of vision of the driver, and means to vary the elevation of at least one of said bars to thereby rotate the plane about an axis formed by a substantially horizontal line through the driver's eyes to thereby vary the angle of said plane with the road.

4. A device for indicating the stopping point of a moving vehicle comprising two sights defining a plane inclined to intersect the road ahead of said vehicle, means responsive to the speed of the vehicle to automatically vertically adjust said sights relative to each other and to the position of the operator's eyes to vary said inclination, and means to simultaneously and equally adjust the height of the two sights to suit the convenience of the user.

5. In a device for indicating the stopping point of a moving vehicle, a casing, two supports having reciprocatory vertical movement within the casing each bearing a sight, cam means to adjust said supports vertically relative to each other, a manually operated means adapted to be set at the speed of the vehicle, and means linking the last mentioned means and the cam means in order to adjust the inclination of the plane defined by said sights in accordance with the speed of the vehicle.

6. A device for locating the stopping point of a moving vehicle comprising a casing, supports carried by said casing having vertical reciprocatory movement within the casing, sights carried by said supports respectively, means to vertically adjust the supports in accordance with the speed of the vehicle, and means to adjust the height of the casing, supports and sights as a unit to suit the convenience of the user, comprising a slide to raise the casing, a screw meshing therewith and manual means to operate the screw.

7. In a device for indicating the stopping point of a moving vehicle, a casing, two sights mounted upon supports having reciprocatory vertical movement within the casing, cam means to adjust said supports relative to each other, a manually operated means adapted to be set at the speed of the car, means linking the last mentioned means and the cam means, in order to adjust the sights in accordance with the speed of the vehicle, and means to adjust the height of the two sights simultaneously to suit the convenience of the user comprising a slide to raise the casing, a screw meshing therewith, and manual means to operate the screw.

8. A device for indicating the stopping point of a moving vehicle on a road comprising parallel horizontal bars carried by the vehicle and so arranged as to form a plane for the line of vision of the driver, and means to differentially vary the elevation of both bars to thereby rotate the plane about an axis formed by a substantially horizontal line through the driver's eyes to thereby vary the angle of said plane with the road.

WALTER N. SMITH.
WILLIAM H. SANDERS.